United States Patent [19]

Matui

[11] Patent Number: 5,124,979
[45] Date of Patent: Jun. 23, 1992

[54] DIGITAL DATA TRANSMISSION DEVICE FOR A COMPOSITE TRANSMISSION SIGNAL COMPRISING A MAIN DATA AND A SUBDATA SIGNAL

[75] Inventor: Hitosi Matui, Tokyo, Japan
[73] Assignee: NEC Corporation, Tokyo, Japan
[21] Appl. No.: 565,529
[22] Filed: Aug. 10, 1990
[30] Foreign Application Priority Data
Aug. 10, 1989 [JP] Japan .................. 1-208222
[51] Int. Cl.$^5$ .............................. H04J 1/14
[52] U.S. Cl. ..................... 370/76; 375/17; 371/56
[58] Field of Search ............ 370/76, 110.1, 110.2; 371/56; 375/19, 20, 17, 39

[56] References Cited

U.S. PATENT DOCUMENTS

| | | | |
|---|---|---|---|
| 4,410,911 | 10/1983 | Field et al. | 370/20 |
| 4,682,334 | 7/1987 | Le Mouel et al. | 375/19 |
| 4,993,046 | 2/1991 | Saito et al. | 375/39 |

FOREIGN PATENT DOCUMENTS 0348968  1/1990  European Pat. Off. ............ 370/20

*Primary Examiner*—Dang Ton
*Attorney, Agent, or Firm*—Sughrue, Mion, Zinn, Macpeak & Seas

[57] ABSTRACT

In a digital data transmission device for transmitting a composite transmission signal comprising a main data signal represented by parallel n bits and a subdata signal, a multilevel encoding unit encodes upper and lower levels of m bits in the main data signal into first and second encoded signals. A first signal converter converts the first and the second encoded signals and an uncoded signal of (n−m) bits in the main data signal to a first converted signal. An inverter inverts the first encoded signal to an inverted signal. A second signal converter converts the inverted signal, the second encoded signal, and the uncoded signal to a second converted signal. A selection unit selects a selected signal from the first and the second converted signals in response to the subdata signal and produces the selected signal as the composite transmission signal. A digital data reception device receives as a reception signal the composite transmission signal produced by the digital data transmission device and comprises a processing unit for processing the reception signal to produce a processed signal and a reproducing unit. Supplied with the processed signal, the reproducing unit reproduces the main data signal and the subdata signal as a reproduced main data signal and a reproduced subdata signal.

4 Claims, 3 Drawing Sheets

DIGITAL DATA TRANSMISSION DEVICE FOR A COMPOSITE TRANSMISSION SIGNAL COMPRISING A MAIN DATA AND A SUBDATA SIGNAL

BACKGROUND OF THE INVENTION

This invention relates to a digital data transmission device for a composite transmission signal comprising a main data and a subdata signal by using a multilevel encoding system and to a digital data reception device for use as a counterpart of the digital data transmission device. Such a digital data transmission device is particularly useful in a data communication system which utilizes a telephone line.

Frequency division is often used in the digital data transmission device in transmitting the subdata signal together with the main data signal. The frequency division digital data transmission device comprises a frequency division multiplexer. The frequency division multiplexer multiplexes the main data signal and the subdata signal into the composite transmission signal. The composite transmission signal is transmitted in a transmission frequency band. In this event, it is necessary to allocate a main frequency band and a subfrequency band for the main data and the subdata signals in the transmission frequency band. A guard band must be used in separating the subfrequency band from the main frequency band. This means that the digital data transmission device of the type described above has a reduced transmission capacity for the main data signal because the main frequency band must be narrowed due to use of the subfrequency band and the guard band. Such a digital data transmission device is not suitable for a data communication system which utilizes a telephone line and is put in operation with its maximum possible transmission capacity.

SUMMARY OF THE INVENTION

It is therefore an object of this invention to provide a digital data transmission device which is capable of producing a composite transmission signal comprising a main data signal and a subdata signal without reduction of a transmission capacity of the main data signal.

It is another object of this invention to provide a digital data reception device which is for use as a counterpart of the digital data transmission device of the type described.

Other objects of this invention will become clear as the description proceeds.

On describing the gist of this invention, it is possible to understand that a digital data transmission device is for transmitting a composite transmission signal comprising a main data signal and a subdata signal. The main data signal is represented by first through n-th bits, where n represents a positive integer. The subdata signal is represented by one of first and second binary values at a time.

The above-understood transmission device comprises a multilevel encoder supplied with m bits in first through n-th bits, where m represents a positive integer which is not greater than n, for encoding upper and lower levels of the m bits into first and second encoded signals, respectively. The m bits are located at consecutive bit positions and are arbitrarily selected from the first through the n-th bits. The transmission device further comprises a first signal converter connected to the multilevel encoder and supplied with (n−m) bits in the main data signal as an uncoded signal for converting the first and the second encoded signals and the uncoded signal into a first converted signal, inverting means for inverting the first encoded signal into an inverted signal, a second signal converter connected to the multilevel encoder and the inverting means and supplied with the uncoded signal for converting the inverted signal, the second encoded signal, and the uncoded signal into a second converted signal, selecting means connected to the first and the second signal converters and supplied with the subdata signal for selecting a selected signal from the first and the second converted signals to produce the selected signal when the subdata signal represents one of the first and the second binary values, and a modulator connected to the selecting means for modulating the selected signal into a modulated signal to produce the modulated signal as the composite transmission signal.

DESCRIPTION OF THE PREFERRED EMBODIMENT

Figure 1:
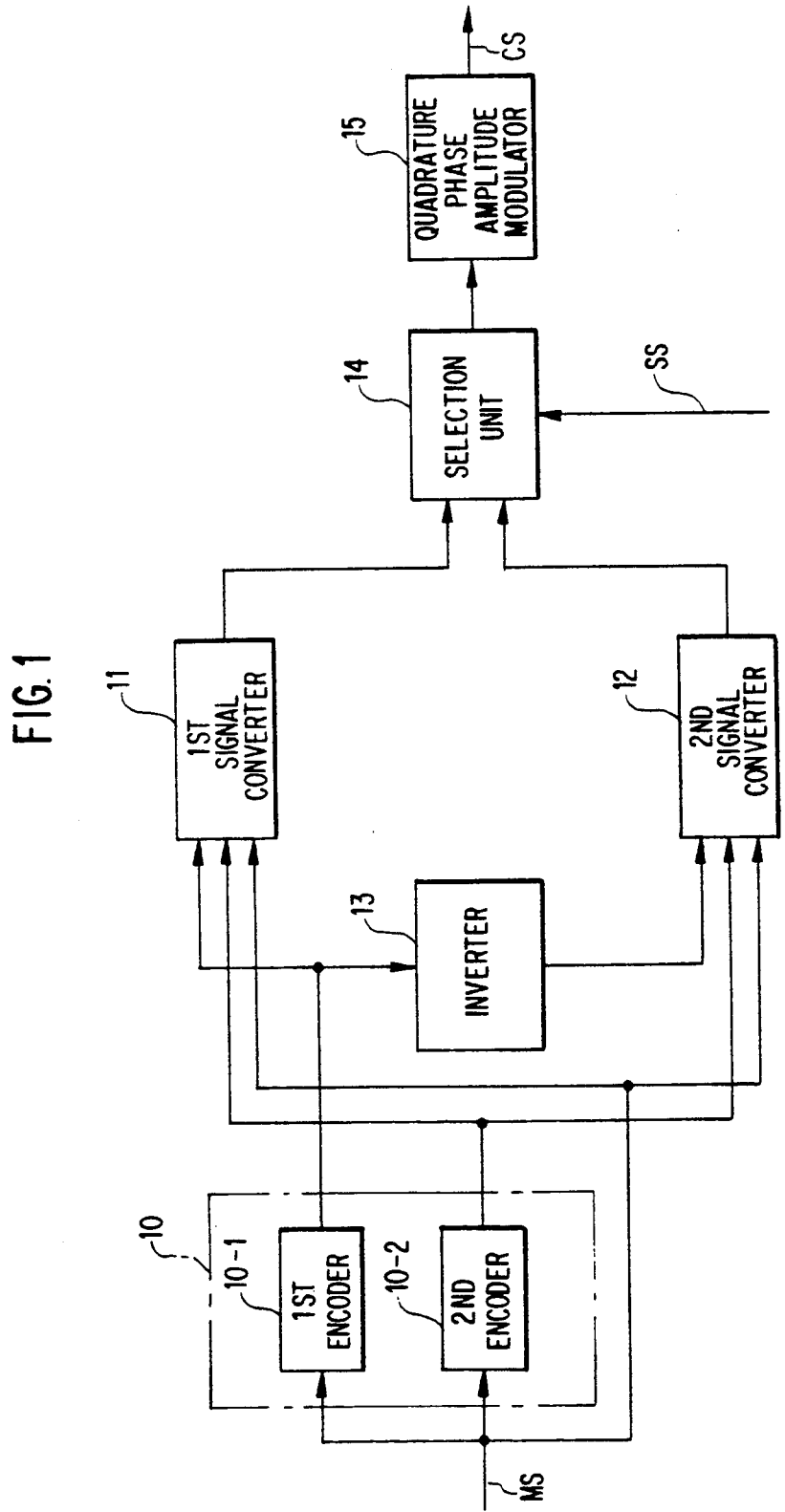
FIG. 1 is a block diagram of a digital data transmission device according to an embodiment of this invention.

Referring to FIG. 1, description will be made as regards a digital data transmission device according to a preferred embodiment of this invention. The digital data transmission device is for use in transmitting a composite transmission signal CS comprising a main data signal MS and a subdata signal SS. The main data signal MS is represented by first through n-th parallel bits, where n represents a predetermined positive integer which is not less than three. The first bit is a least significant bit. It will be assumed merely for brevity of the description that the positive integer is equal to forty-eight. The subdata signal SS is represented by one of first and second binary bits "1" and "0".

The digital data transmission device comprises a multilevel encoding unit 10 supplied with m bits in the main data signal MS, where m represents a positive integer which is not greater than n. The m bits which are located at consecutive bit positions may be arbitrarily selected from n bits. It will be assumed merely for brevity of the description that the number m is equal to thirteen and that the m bits are represented by the first through the thirteenth bits. The multilevel encoding unit 10 comprises a first encoder 10-1 for encoding an upper level of the first through the thirteenth bits into a first encoded signal and a second encoder 10-2 for encoding a lower level of the first through the thirteenth bits into a second encoded signal. Each of the first and the second encoders 10-1 and 10-2 is generally a convolutional encoder. It is to be noted here that the first encoder 10-1 can be implemented by a simple encoder having a constraint length which is equal to unity. This is because a Hamming distance may approximately be equal to two. The first encoder 10-1 supplies the first encoded signal to a first signal converter 11 directly and to a second signal converter 12 through an inverter 13. The second encoder 10-2 supplies the second encoded signal directly to the first and the second signal converters 11 and 12. The inverter 13 inverts the first encoded signal into an inverted signal and supplies the inverted signal to the second signal converter 12. In addition, each of the first and the second signal converters 11 and 12 is directly supplied with fourteenth through forty-eighth bits of the main data signal MS as an uncoded signal.

Supplied with the uncoded signal and the first and the second encoded signals, the first signal converter 11 converts the uncoded signal and the first and the second encoded signals to a first converted signal. Likewise, the second signal converter 12 converts the uncoded signal, the inverted signal, and the second encoded signal to a second converted signal. The first signal converter 11 is for mapping the uncoded signal and the first and the second encoded signal as signal points in a multidimensional space in a manner disclosed in Japanese Unexamined Patent Prepublication No. Hei 1-175440, namely, 175440/1989 assigned to the present assignee. Similarly, the second signal converter 12 is for mapping the uncoded signal and the inverted signal and the second encoded signal in the multidimensional space. Each of the first and the second signal converters 11 and 12 may therefore be called a signal point mapping unit. The first signal converter 11 can be implemented by an ROM (Read Only Memory) which is supplied as an address signal with the uncoded signal and the first and the second encoded signals. Likewise, the second signal converter 12 can be implemented by another ROM. According to the multilevel encoding unit 10, mapping is carried out without variation of Euclidean distance between two adjacent signal points although the first encoded signal is inverted by the inverter 13. This means that it is possible to prevent influence on coding gain.

A selection unit 14 is connected to the first and the second signal converters 11 and 12 and is supplied with the subdata signal SS. The selection unit 14 selects a selected signal from the first and the second converted signals when the subdata signal SS represents one of the first and the second binary bits "1" and "0". For example, the selection unit 14 produces the first converted signal when the subdata signal SS represents the first binary bit "1". The selection unit 14 produces the second converted signal when the subdata signal SS represents the second binary bit "0". It is assumed that each of the first and the second converted signals is supplied to the selection unit 14 2800 times per second and that the subdata signal SS has a predetermined bit rate which is equal to 100 (bp/s). In this event, the selection unit 14 carries out selecting operation each time when each of the first and the second converted signals is supplied to the selection unit 14 28 times.

A quadrature phase amplitude modulator 15 modulates the first and the second converted signal into a quadrature phase modulated signal. The quadrature phase modulated signal is supplied to a transmitter (not shown) as the composite transmission signal CS. The transmitter transmits the composite transmission signal CS through a transmission line, such as a telephone line.

Figure 2:
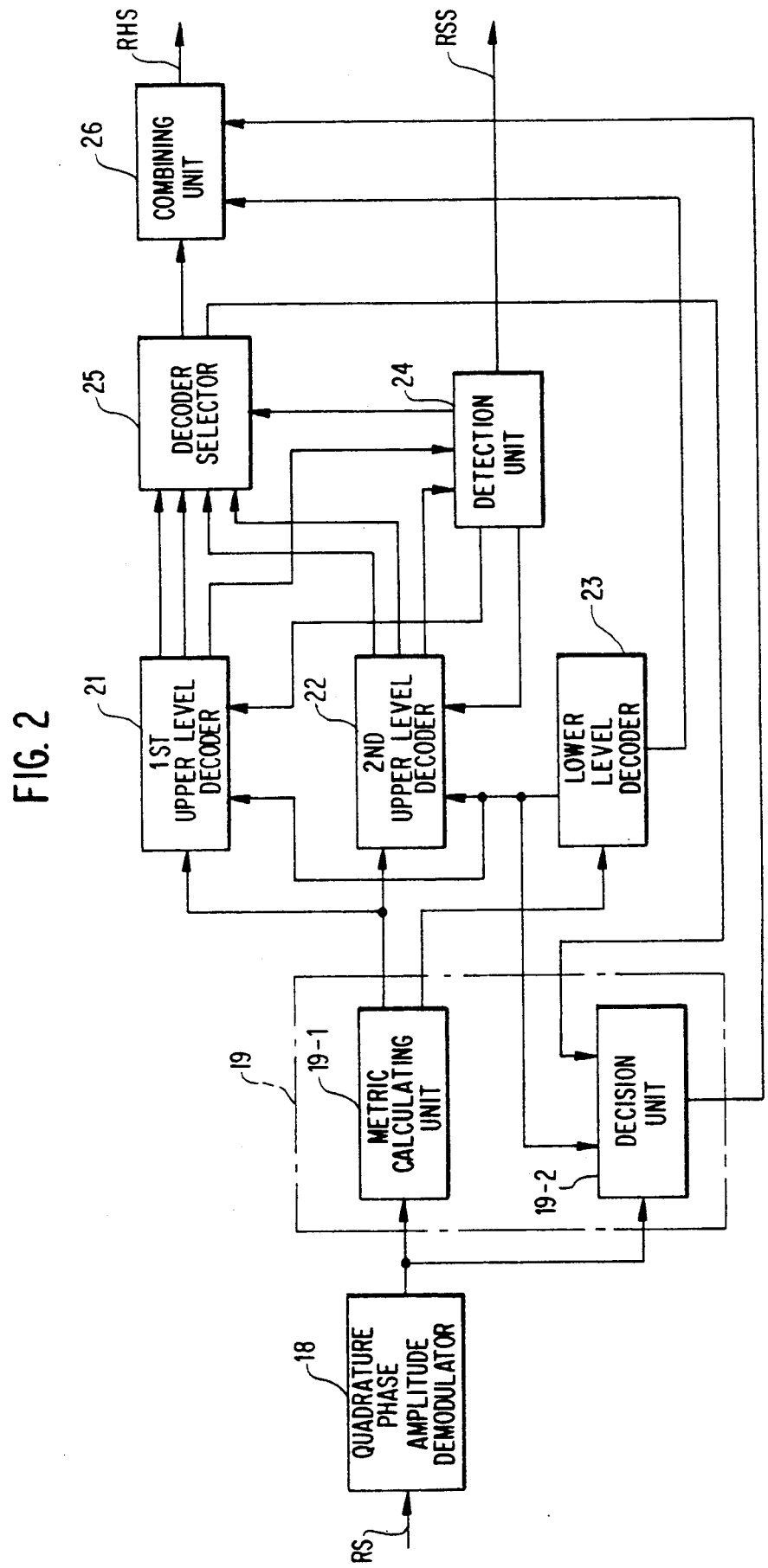
FIG. 2 is a block diagram of a digital data reception device for use as a counterpart of the digital data transmission device shown in FIG. 1.

Referring to FIG. 2, the description will proceed to a digital data reception device for use as a counterpart of the digital data transmission device illustrated with reference to FIG. 1. The digital data reception device is supplied as a reception signal RS with the composite transmission signal transmitted from the transmitter of the digital data transmission device. The composite transmission signal comprises a main data component converted from the main data signal MS (FIG. 1) and a subdata component converted from the subdata signal SS (FIG. 1). The reception signal RS is a selected signal selected by the subdata signal from the first and the second converted signals which are described in conjunction with FIG. 1. The first converted signal comprises an uncoded component which are not encoded, an upper level component, namely, a first encoded component, and a lower level component, namely, a second encoded component converted from the first through the thirteenth bits of the main data signal. The second converted signal comprises an inverted component converted from the upper level component and the lower level component with the upper level component of the inverted component converted by the inverter 13 described in conjunction with FIG. 1. The digital data transmission device reproduces the main and the subdata signals as a reproduced main data signal RMS and a reproduced subdata signal RSS in the following manners.

The digital data reception device comprises a quadrature phase amplitude demodulator 18 supplied with the reception signal RS for demodulating the reception signal RS into a baseband signal and supplies the baseband signal as a demodulated signal to a processing unit 19. Supplied with the demodulated signal, the processing unit 19 carries out process operation of the demodulated signal in the manner known in the art. The processing unit 19 comprises a metric calculating unit 19-1 and a decision unit 19-2. The metric calculating unit 19-1 is for calculating a first metric of the upper level component to produce an upper level branch metric signal and for calculating a second metric of the lower level component to produce a lower level branch metric signal. The decision unit 19-2 is for carrying out level decision operation of the uncoded component to produce a level decision signal. The level decision signal, the upper level branch metric signal, and the lower level branch metric signal may be collectively called a processed signal. In addition, the level decision signal may be called an uncoded processed signal.

A reproducing unit 20 comprises a first and a second upper level decoder 21 and 22 and a lower level decoder 23, each of which comprises a Viterbi decoder. Each of the first and the second upper level decoders 21 and 22 is supplied with the upper level branch metric signal. The first upper level decoder 21 is for decoding the first encoded component while the second upper level decoder 22 is for decoding the inverted component. The lower level decoder 23 is supplied with the lower level branch metric signal and decodes the lower level branch metric signal into a lower level estimated signal as a resultant of estimation of the lower level component and into a lower level decoded signal as a resultant of Viterbi decoding operation. The lower level estimated signal is supplied to the first and the second upper level decoders 21 and 22 and the decision unit 19-2.

Supplied with the upper level branch metric signal and the lower level estimated signal, the first upper level decoder 21 decodes the upper level branch metric signal into a first upper level estimated signal as a resultant of estimation of the first encoded component and into a first upper level decoded signal as a resultant of Viterbi decoding operation. Furthermore, the first upper level decoder 21 supplies as a first internal status signal a first metric signal to a detection unit 24. The first metric signal indicates a minimum value of a path metric and represents an internal state of the first upper level decoder 21.

Similarly, the second upper level decoder 22 is supplied with the upper level branch metric signal and the lower level estimated signal and decodes the upper level branch metric signal into a second upper level estimated signal as a resultant of estimation of the inverted component and into a second upper level decoded signal as a resultant of Viterbi decoding operation. The second upper level decoder 22 supplies as a second internal status signal a second metric signal to the detection unit 24. The second metric signal indicates a minimum value of the path metric and represents an internal state of the second upper level decoder 22.

Figure 3:
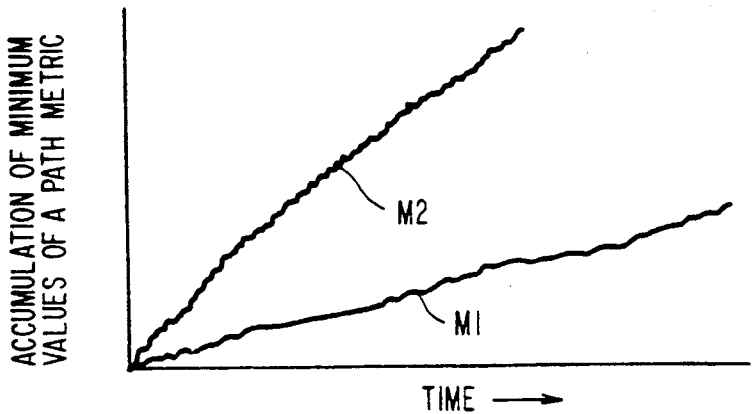
FIG. 3 shows a graphical representation for use in describing operation of a first and a second most significant bit decoder shown in FIG. 2.

Referring to FIG. 3, a first curve M1 shows an accumulation of the minimum values of the path metric in case of a correct Viterbi decoding operation. A second curve M2 shows an accumulation of the minimum values of the path metric in case of an incorrect Viterbi decoding operation.

It will be assumed that the first upper level decoder 21 carries out the correct Viterbi decoding operation and that the second upper level decoder 22 carries out the incorrect Viterbi decoding operation. In this event, the minimum value in the first metric signal increases slower than the minimum value in the second metric signal. Therefore, an accumulation of a difference calculated by subtracting the minimum value in the first metric signal from the minimum value in the second metric signal has a positive value.

On the contrary, if the first upper level decoder 21 carries out the incorrect Viterbi decoding operation while the second upper level decoder 22 carries out the correct Viterbi decoding operation. The accumulation of the difference calculated by subtracting the minimum value in the first metric signal from the minimum value in the second metric signal has a negative value.

Supplied with the first and the second metric signals, the detection unit 24 detects which of the first and the second upper level decoders 21 and 22 is normal. In other words, the detection unit 24 detects whether or not the accumulation of the difference calculated by subtracting the minimum value in the first metric signal from the minimum value in the second metric signal is a positive value.

Figure 4:
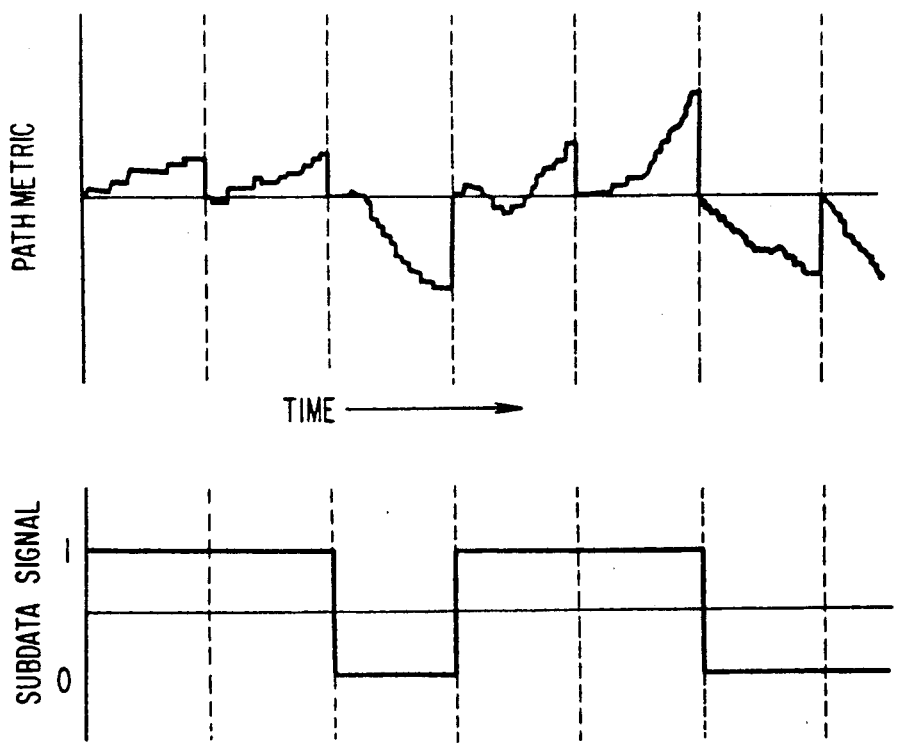
FIG. 4 shows waveforms for use in describing operation of a detection unit shown in FIG. 2.

Referring to FIG. 4, the detection unit 24 produces a detection result signal represented by the binary bit "1" as the reproduced subdata signal RSS when the accumulation of the difference has the positive value. The detection unit 24 produces a detection result signal represented by the binary value "0" as the reproduced subdata signal RSS when the accumulation of the difference has the negative value. For brevity of the description, the accumulation of the difference and the reproduced subdata signal RSS are illustrated without a time lag between the accumulation of the difference and the reproduced subdata signal RSS. In practice, the reproduced subdata signal RSS is reproduced at a trailing edge of the accumulation of the difference. A time interval of accumulation in the detection unit 24 is equal to a time interval of selecting operation in the selection unit 14 (FIG. 1).

After the detecting operation described above, the detection unit 24 clears the accumulation of the difference and supplies a reset signal to one of the first and the second upper level decoders 21 and 22 which carry out the incorrect Viterbi decoding operation. Simultaneously, the detection unit 24 supplies a selection signal to a decoder selector 25. The reset signal is for resetting the incorrect Viterbi decoding operation to put in a normal state. As a result, each of the first and the second most-significant-bit decoders 21 and 22 is put in the normal state and can carry out the correct Viterbi decoding operation. The selection signal is for indicating one of the first and the second upper level decoded signals which are normally decoded.

A decoder selector 25 is supplied with the first and the second upper level decoded signals, the first and the second upper level estimated signals, and the selection signal. The decoder selector 25 selects a selected decoded signal as a normal upper level decoded signal from the first and the second upper level decoded signals and selects a selected estimated signal as a normal upper level estimated signal from the first and the second upper level estimated signals in response to the selection signal.

The decision unit 19-2 is supplied with the demodulated signal, the lower level estimated signal, and the normal upper level estimated signal and carries out the level decision operation of the uncoded component by using the lower level estimated signal and the normal upper level estimated signal and delivers the level decision signal to a combining unit 26.

Supplied with the level decision signal, the lower level decoded signal, and the normal upper level decoded signal, a combination unit 26 combines the level decision signal, the lower level decoded signal, and the normal upper level decoded signal into a combined signal and produces the combined signal as the reproduced main data signal RMS.

While this invention has thus far been described in conjunction with a preferred embodiment thereof, it will readily be possible for those skilled in the art to put this invention into practice in various other manners. For example, the multilevel encoding unit 10 may comprise a plurality of encoders the number of which may be equal to two or more in accordance with a bit number of the main data signal.

What is claimed is:

1. A digital data transmission device for transmitting a composite transmission signal comprising a main data signal and a subdata signal, said main data signal being represented by first through n-th bits where n represents a positive integer, said subdata signal being represented by one of first and second binary values at a time, said transmission device comprising:

a multilevel encoder supplied with m bits which are selected from said first through n-th bits, where m represents a positive integer which is not greater than n, for encoding upper and lower levels of said m bits into first and second encoded signals, respectively;

a first signal converter connected to said multilevel encoder and supplied with (n−m) bits in said main data signal as an uncoded signal for converting said first and said second encoded signals and said uncoded signal into a first converted signal;

inverting means for inverting said first encoded signal into an inverted signal;

a second signal converter connected to said multilevel encoder and said inverting means and supplied with said uncoded signal for converting said inverted signal, said second encoded signal, and said uncoded signal into a second converted signal;

selecting means connected to said first and said second signal converters and supplied with said subdata signal for selecting a selected signal from said first and said second converted signals to produce said selected signal when said subdata signal represents one of said first binary value and said second binary value; and a modulator connected to said selecting means for modulating said selected signal into a modulated signal to produce said modulated signal as said composite transmission signal.

2. A digital data reception device supplied with a composite transmission signal comprising a main data component and a subdata component, said main data component being converted from a main data signal which is represented by first through n-th bits where n represents a positive integer, said subdata component being converted from a subdata signal which is represented by one of first and second binary values at a time, said composite transmission signal being a selected signal selected from first and second converted signals in response to said subdata signal, said first converted signal comprising upper level and lower level components converted from m bits which are selected from said main data signal where m represents a positive integer which is not greater than n and an uncoded component converted from (n−m) bits in said main data signal, said second converted signal comprising an inverted component of said upper level component and said lower level component and said uncoded component, said reception device comprising:

a demodulator supplied with said composite transmission signal for demodulating said composite transmission signal into a demodulated signal comprising said first and said second converted signals;

processing means connected to said demodulator for processing said demodulated signal to produce a processed signal; and reproducing means connected to said processing means and supplied with said processed signal for reproducing said main and said subdata signals as a reproduced main data signal and a reproduced subdata signal.

3. A digital data reception device as claimed in claim 2, wherein said processing means comprises:

metric calculating unit for calculating a first metric of said upper level component to produce an upper level branch metric signal and for calculating a second metric of said lower level component to produce a lower level branch metric signal; and a decision unit for carrying out level decision operation of said uncoded component to produce a level decision signal.

4. A digital data reception device as claimed in claim 3, wherein said reproducing means comprises:

a lower level decoder for decoding said lower level branch metric signal into a lower level decoded signal as a resultant of decoding operation of said lower level component and into a lower level estimated signal as a resultant of estimation of said lower level component;

a first upper level decoder for decoding said upper level branch metric signal into a first upper level decoded signal as a resultant of decoding operation of said upper level compnent and into a first upper level estimated signal as a resultant of estimation of said upper level component and into a first metric signal indicating an internal state of said first upper level decoder;

a second upper level decoder for decoding said upper level branch metric signal into a second upper level decoded signal as a resultant of decoding operation of said inverted component and into a second upper level estimated signal as a resultant of estimation of said inverted component and into a second metric signal indicating an internal state of said second upper level decoder;

a detection unit connected to said first and said second upper level decoders and supplied with said first and said second metric signals for detecting which of said first and said second upper level decoders is normal, said detection unit thereby producing a selection signal for selecting one of said first and said second upper level decoded signals and one of said first and said second upper level estimated signals and thereby producing a detection result signal as a reproduced subdata signal;

selection means connected to said first and said second upper level decoders and said detection unit and supplied with said first and said second upper level decoded signals, said first and said second upper level estimated signals, and said selection signal for selecting said one of the first and the second upper level decoded signals as a normal upper level decoded signal and for selecting said one of the first and the second upper level estimated signals as a normal upper level estimated signal, said normal upper level decoded signal and said normal upper level estimated signal being determined by said one of said first and said second upper level decoders that is normal; and combining means connected to said decision unit, said lower level decoder, and said selection means and supplied with said level decision signal, said lower level decoded signal, and said normal upper level decoded signal for combining said level decision signal, said lower level decoded signal and said normal upper level decoded signal into a combined signal to produce said combined signal as said reproduced main data signal.

* * * * *